Jan. 30, 1923.

H. E. S. HOLT.
PARACHUTE.
FILED MAY 11, 1920.

Inventor
Harold Edward Sherwin Holt
By B. Singer, Atty.

H. E. S. HOLT.
PARACHUTE.
FILED MAY 11, 1920.

H. E. S. HOLT.
PARACHUTE.
FILED MAY 11, 1920.

H. E. S. HOLT.
PARACHUTE.
FILED MAY 11, 1920.

H. E. S. HOLT.
PARACHUTE.
FILED MAY 11, 1920.

Patented Jan. 30, 1923.

1,443,745

UNITED STATES PATENT OFFICE.

HAROLD EDWARD SHERWIN HOLT, OF FARNBOROUGH, HANTS, ENGLAND.

PARACHUTE.

Application filed May 11, 1920. Serial No. 380,646.

(GRANTED UNDER THE PROVISIONS OF THE ACT OF MARCH 3, 1921, 41 STAT. L., 1313.)

*To all whom it may concern:*

Be it known that I, HAROLD EDWARD SHERWIN HOLT, a subject of the King of Great Britain, residing at The Grange, Farnborough, Hants, England, have invented a new and useful Parachute (for which I have filed an application in England, October 16, 1918, No. 16855/18), of which the following is a specification.

This invention relates to a parachute apparatus for lowering persons from aircraft of the kind wherein the parachute is packed in a box or case capable of being attached to the person to be lowered.

The invention is also applicable for lowering a dead load such as a mail bag or parcel from aircraft to the ground as it enables the load to be launched into the air from a comparatively high altitude when desired without fear of its drifting unduly and coming down outside the chosen landing area.

According to this invention a small auxiliary parachute is employed for withdrawing the main parachute from the box or case, the main parachute being retained therein for a variable period after being launched into the air before it is released and withdrawn by means under manual or automatic control.

A smoke cartridge, light or signal flare may be connected into the cord between the auxiliary and main parachute and ignited electrically to produce a smoke screen, or illuminate the ground or give a signal as the case may be.

In packing the main parachute in its box or case the fabric is folded while the cords are either wound on a real or packed in other ways, and in order to facilitate the forcing open of the folded fabric by air pressure the usual aperture in the top of the parachute is or may be temporarily closed by a sheet of paper or other material secured thereover, which causes the air entering the folded parachute to distend the fabric before it escapes by the tearing of the paper or other material.

When the parachute is intended for personal use its containing box or case is fixed to a harness whereby it can be strapped or secured to the back of an aeronaut, but when the parachute is employed for lowering mail bags or parcels its containing box or case is supported in a bottomless casing fixed in the aircraft, the bag or parcel being suspended from the bottom of the box and the whole released by withdrawing the supports.

As employed for personal use the apparatus is self contained that is to say the moment the aeronaut leaves the aircraft he is entirely disconnected from it mechanically and the subsequent operations which permit the folded parachute to come out of its box or case and become effective are dependent upon the actuation of release means such as a release bolt by the aeronaut as he descends or by a delay mechanism which is set in action when the aeronaut leaves his seat or climbs out of the cock-pit in case he is making the descent from an aeroplane for example. Suitable means for starting the delay mechanism may include a cord or lever attached to some portion of the aeroplane or seat and adapted to act by pulling out a pin or other holding device employed to keep the delay mechanism inoperative until required. The delay mechanism may be worked by compressed air, clockwork mechanism, or time fuse.

Provision is also made in some cases for tilting the parachute during the descent by which means it can be steered to some extent.

The size of the opening in the top of the fabric is also made adjustable so that it can be increased or diminished to accelerate or retard the descent.

The invention is hereinafter more fully described with reference to the accompanying drawings wherein similar reference characters are employed to designate similar parts throughout the different figures and in which.

Referring to Figs. 1 to 7, a box $a$ made of fibre sheet or other material is fitted with a hinged lid $b$ held in the closed position by a spring coiled on the hinge pin or otherwise applied in a known manner. The box $a$ is adapted to be carried on the back of an aeronaut for which purpose it is attached by bolts or rivets to a harness comprising shoulder straps $c$ attached at the back to cross strips $c'$ and also connected across the chest and secured by chains $d$ or the like passed under the arms from back to front where rings $d'$ on the ends of the chains are engaged in hooks $e$ on the ends of the shoulder straps $c$.

Figure 1:
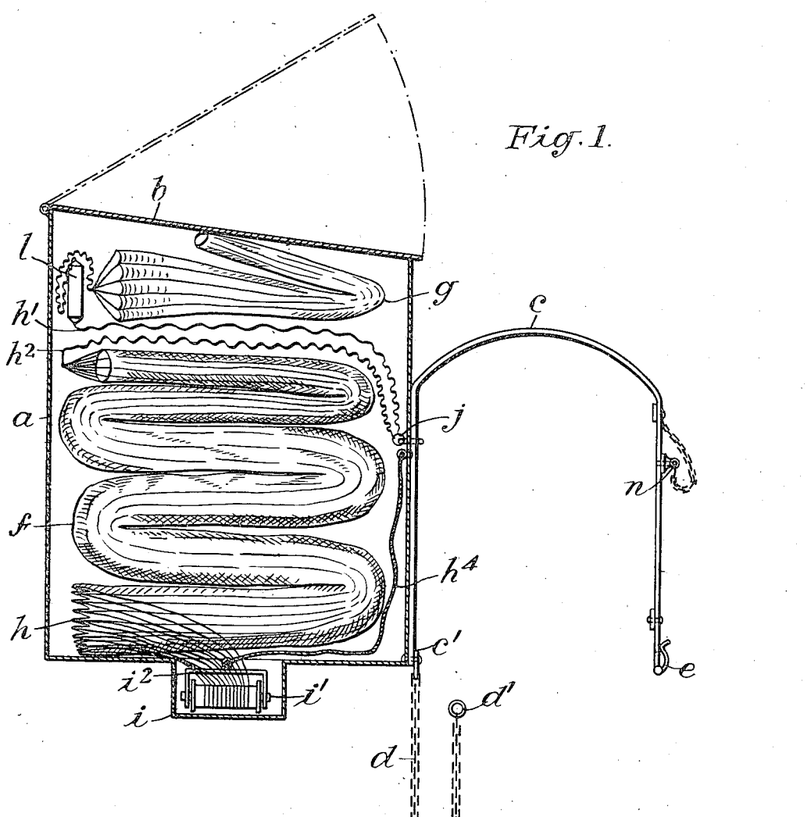
Fig. 1 is a sectional elevation of one form of apparatus constructed according to this invention.
Figure 2:
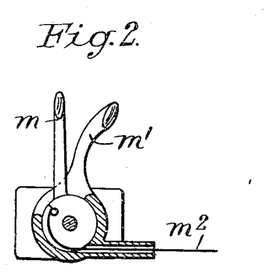
Fig. 2 and Fig. 3 are detail views of manually controlled release mechanism.

As shown in Fig. 1 a main parachute $f$ and a pilot parachute $g$ are folded and placed in the box $a$ the cords $h$ of the main parachute being connected to and wound upon a reel $i$ packed in a recess in the bottom of the box while the pilot parachute is connected by cords $h'$ $h^2$ with the top of the main parachute.

The connection between the cords $h$ of the main parachute $f$ and the reel $i$ is made by a short cord or cords $h^3$ arranged to transmit the pull of the parachute more or less evenly to the reel. An axle or spindle $i'$ passing through the reel is mounted in a yoke $i^2$ to which one end of the main cord $h^4$ of the parachute is attached, its other end being attached to a ring connected through the box with the harness by which the aeronaut is suspended when making a descent.

Figure 3:
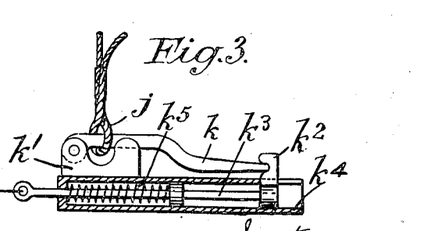
Figure 4:
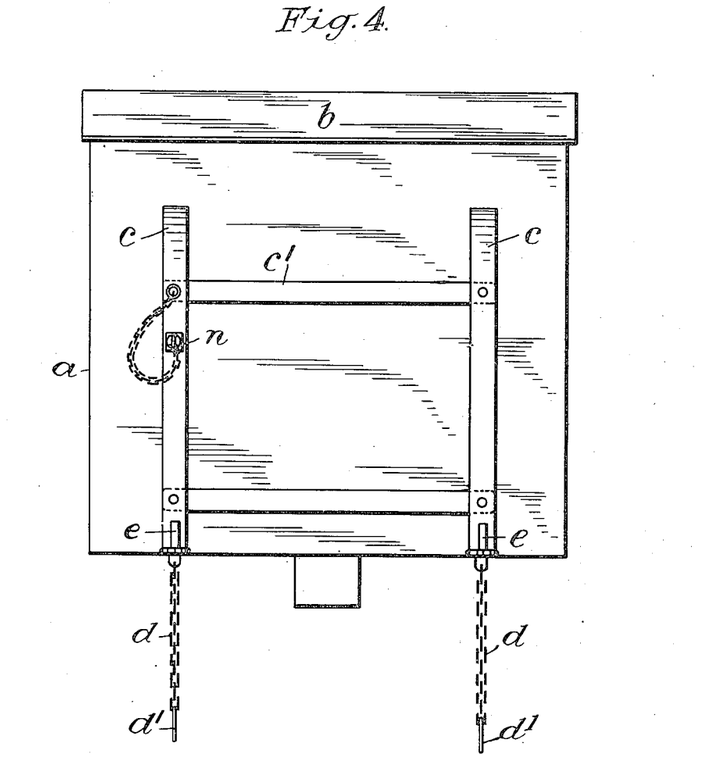
Fig. 4 is an elevation at right angles to Fig. 1.
Figure 5:
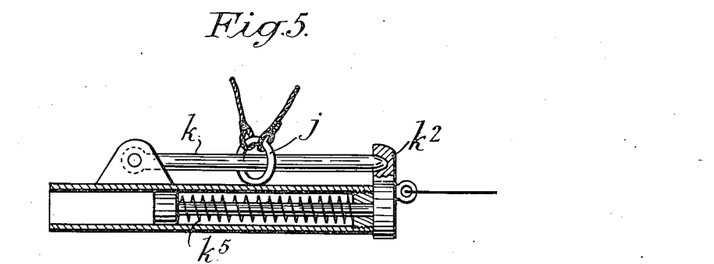
Fig. 5 illustrates a further form of manually controlled release mechanism.
Figures 6, 7:
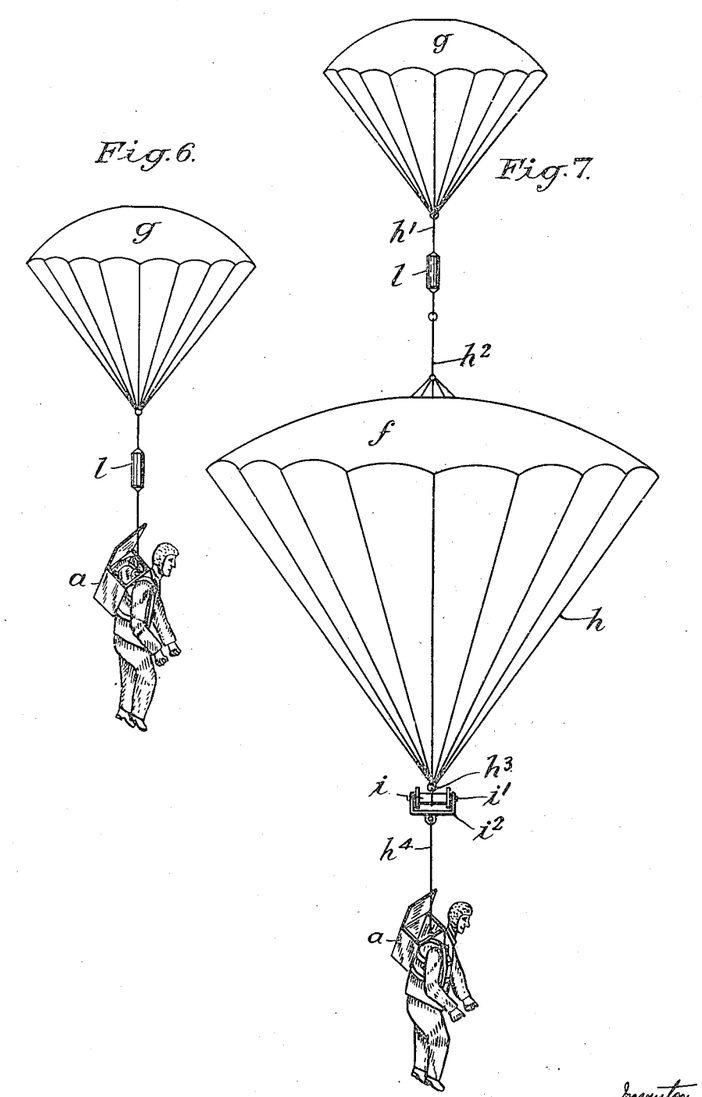
Figs. 6 and 7 illustrate the apparatus in use before and after the withdrawal of the main parachute by the pilot parachute.

The cord $h^2$ connected with the top of the main parachute runs to a ring or loop $j$ capable of being detachably secured to the harness by a lever or pivoted coupling pin $k$ Fig. 3 or Fig. 5. The cord $h'$ connects with same ring or loop $j$ a smoke cartridge, flare or light signal $l$ and through it the cords of the pilot parachute $g$ which lies in the box above the main parachute.

Different manually operated devices for holding and releasing the coupling pin $k$ are shown in Figs. 2 to 5.

As illustrated in Fig. 3 the pin $k$ is pivoted in a lug or bracket $k'$ shaped to retain the loop $j$ on the part of the pin near its pivot, a catch $k^2$ is arranged to be pulled into engagement with the free end of the pin by a rod $k^3$ working in a tubular guide $k^4$ integral with the lug $k'$ and a spring $k^5$ coiled on the rod tends to release the pin, so that in this case it is necessary to maintain a constant pull on the rod against the spring to prevent the pin $k$ moving into the release position. A controlling lever $m$ mounted adjacent to a fixed grip arm $m'$ is connected by a wire $m^2$ with the rod $k^3$, and is mounted on the shoulder strap or other part of the harness in a convenient position to be gripped by the aeronaut who by pressing the parts $m$, $m'$ together is able to hold the catch $k^2$ in engagement with the coupling pin $k$ and prevent the release and withdrawal of the main parachute from the box, but immediately lever $m$ is released the main parachute is free to be withdrawn from the box by the pilot parachute, which in this case has been previously pulled out by hand.

The converse arrangement is shown in Fig. 5, the catch $k^2$ being in this case held in engagement with the pin $k$ by the spring $k^5$ and released by a pull against the action of the spring.

When the smoke cartridge or flare $l$ is employed a small electric battery is provided in the box $a$ and connected with an igniting device on the cartridge $l$ by circuit wires passed up the cords of the main parachute and along the fabric in any convenient way the circuit being closed by a switch $n$ on the harness. On being ignited the cartridge burns the cord and detaches the small parachute which thereafter supports the cartridge or flare separate from the main parachute and controls its descent.

Figure 8:
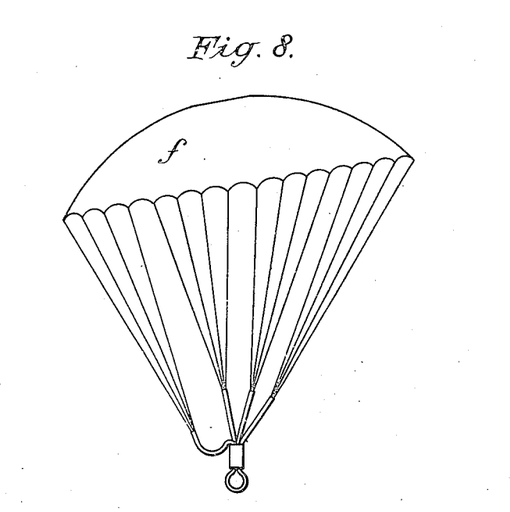
Figs. 8 and 9 illustrate respectively a parachute as adapted for steering and a parachute with adjustable central aperture.

As shown in Fig. 8 the cords of the parachute may be connected near their lower ends in groups enabling the cords of any particular group to be pulled downwards by the aeronaut to produce a tilting of the fabric for steering the parachute.

Figure 9:
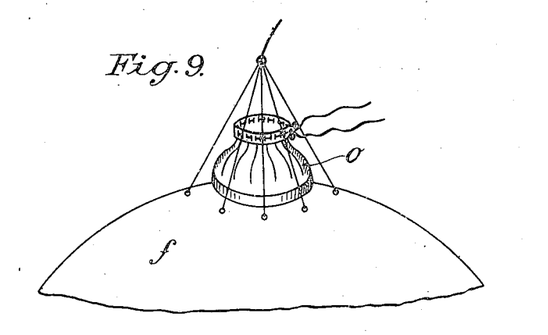

In Fig. 9 the aperture in the top of the parachute is shown equipped with an extended air outlet $o$ of fabric provided with a draw string for varying the size of the outlet.

Figure 10:
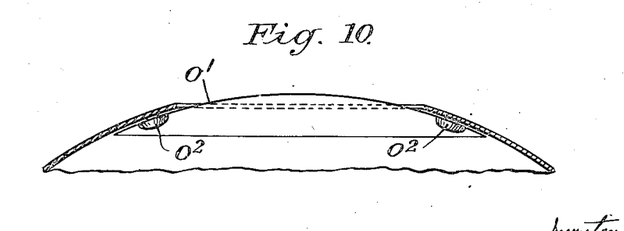
Fig. 10 is a section through the central portion of a parachute fabric showing the application of a frangible closure thereto.

In Fig. 10 an arrangement is illustrated for facilitating the forcing open of the folds of a parachute by air pressure. For this purpose the usual aperture in the top of the parachute is temporarily closed by a sheet $o'$ of paper or other material secured in position on the underside of the fabric by press studs $o^2$ or other means, and arranged to confine the air entering the parachute until the parachute is forced open thereby, and the pressure is sufficient to tear the paper.

Figure 11:
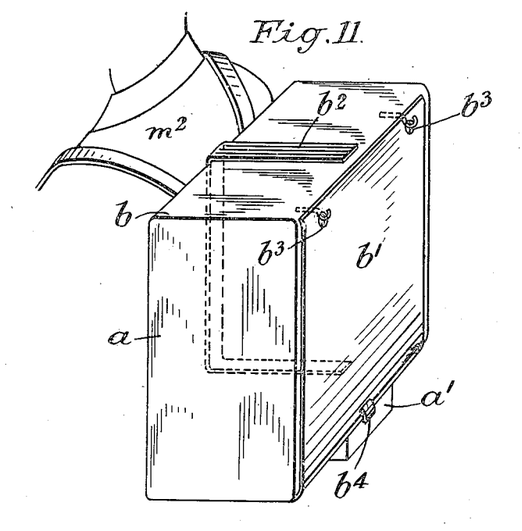
Fig. 11 is an isometric view of a modified form of parachute holder or case.

Fig. 11 illustrates a parachute box, case or container $a$ of modified form, made of fibre sheet or other light material and comprising a hinged lid $b$ and a detachable flap $b'$ arranged to hold the lid in the closed position against the pull of an elastic band $b^2$ attached to the top of the lid and to the bottom of the box as shown. Near the upper edge of the flap $b'$ are two holes $b^3$ for receiving hooks fixed to the lid $b$ and at the lower edge of the flap a tongue piece $b^4$ is provided for the engagement of a bolt or pin capable of being released by manually operated means of the kind already described in connection with the release of the parachute, or automatically as hereinafter described.

In the arrangement shown in Fig. 11 a pilot parachute for withdrawing the main parachute from the box $a$ is placed between the flap $b'$ and the side of the box, thus tending to force the flap open, so that upon the release of the flap by one of the methods referred to, it readily opens at the bottom edge and rises with the lid whereupon the air pressure carries it off the hooks on the lid both the pilot and main parachutes being thus free to come into operation.

It will be understood that in cases where automatic releasing means is employed it is arranged to operate entirely independently of any conscious act on the part of the aeronaut after the descent begins and is controlled by a timing or delay mechanism which is set in motion when the aeronaut leaves his seat or otherwise.

Figure 12:
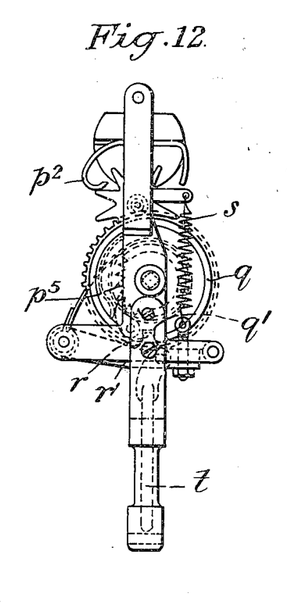
Figs. 12 and 13 are elevations at right angles to each other illustratiing a delay mechanism for timing and effecting the release of the main parachute.
Figure 13:
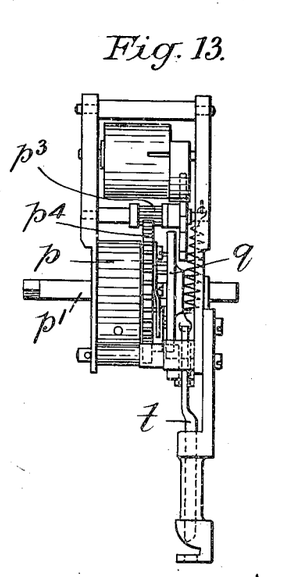

A form of clockwork delay mechanism is illustrated in Figs. 12 and 13 which is intended to be carried in a receptacle $a'$ on the bottom of the box $a$ and to release a bolt located for engagement with the fastening tongue $b^4$ of the flap $b'$.

This mechanism comprises a spring $p$ with central driving and winding spindle $p'$, an escapement mechanism $p^2$ geared to the spindle by a pinion $p^3$, wheel $p^4$ and ratchet and pawl mechanism $p^5$ and a disc $q$ formed with a notch $q'$. Disc $q$ is rotated by the spindle $p'$ and bearing against its periphery is a tooth $r$ formed on a lever $r'$ which is pulled by a spring $s$ towards the disc. A bolt $t$ is connected with the lever $r'$ and is arranged to slide in guides its outer end being arranged to engage the fastening tongue $b^4$.

When the notch in the disc $q$ comes opposite the tooth $r$, the tooth enters the notch and by the resulting movement of the lever $r'$ the bolt $t$ is moved into the release position. By suitably setting the disc $q$ beforehand a longer or shorter delay can be provided for before the release bolt is operated. It will be understood that this mechanism is merely given as an example of one type of delay mechanism capable of being employed for releasing the parachute, and that any other type of delay mechanism may be used.

Figure 18:
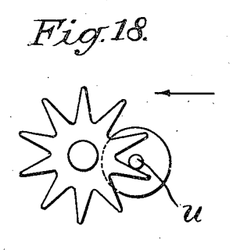
Figs. 18 and 19 are end and sectional elevations illustrating means for normally locking the delay mechanism shown in Figs. 12 and 13.
Figure 19:
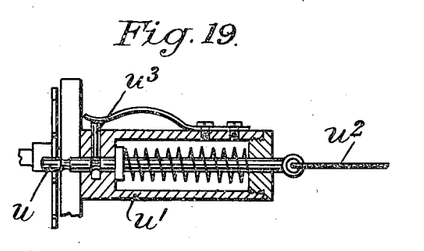

After the delay mechanism has been wound up or set ready for operation it is locked by a spring pressed pin $u$ engaging between the teeth of the escapement wheel as shown in Figs. 18 and 19. This pin is mounted to slide in a guide $u'$ and is pulled out of engagement with the wheel by a cord or wire $u^2$ actuated either by hand or automatically as hereinbefore described. A catch pin $u^3$ is pressed against the pin $u$ by a spring and engages in grooves in the extreme positions of the pin $u$ so that this pin is retained in either of said positions until sufficient force is applied to move it past the catch pin.

Figure 17:
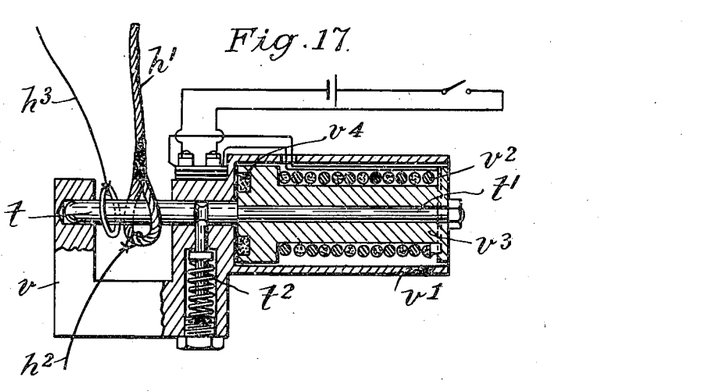
Fig. 17 is a section of a time fuse delay mechanism an alternative method of releasing the main parachute.

An alternative means of operating a release bolt $t$ to enable the main parachute to be withdrawn from its box by a pilot parachute is shown in Fig. 17. In this case a time fuse is employed to fire an expelling charge of powder to withdraw the bolt $t$. The arrangement is applicable chiefly to the outside of a box or container preferably near the upper edge, and comprises a metal bracket $v$ having a tubular portion $v'$ for receiving the time fuse which is composed of a length of fuse material $v^2$ wound on a wooden core $v^3$ having at its inner end a recess for holding a small explosive charge of powder $v^4$. An extension $t'$ of the release bolt $t$ runs through the core of the time fuse and is threaded to receive a fixing nut, $t^2$ indicates a spring catch pin engaging a groove in the bolt $t$ to maintain the bolt in position until it is forcibly withdrawn.

The fuse is ignited electrically when the apparatus is launched in the air, and when the powder charge is exploded it expels the fuse core which withdraws the bolt $t$ and carries it away.

The cords held by the bolt are thus released. Those shown are the two cords $h'$, $h^2$ connecting the pilot parachute with the main parachute. Alternatively a retaining cord such as $h^{13}$ may be held at one end by the bolt and secured at its opposite end to a lug on the opposite side of the container. (See also Fig. 14.)

In this case the cord or cords connecting the pilot parachute with the main parachute need not be anchored to the release bolt, as the cord $h^{13}$ will retain the main parachute in the container until it is released by the bolt.

If a delay mechanism be employed which is worked by compressed air a cylinder or collapsible bellows container for the compressed air may be fitted with a cock by the opening of which compressed air may be allowed to escape slowly and relieve the pressure on a spring previously kept in tension thereby, the motion produced by the reaction of the spring being utilized to ultimately release the parachute after a predetermined interval.

Usually the automatic delay mechanism would be arranged to obtain a delay of 1 to 5 seconds to enable an aeronaut to jump clear of the aeroplane, airship or balloon before the pilot parachute would become operative to release the main parachute.

Instead of an ordinary pilot parachute a parachute constructed on the principle of an ordinary umbrella may be used, but with a hole of suitable size in the centre, the parachute remaining folded until released by the release mechanism. Or an ordinary pilot parachute may be employed together with a second and smaller pilot parachute either of the umbrella type or of the ordinary form.

In order to ensure the quick opening of the parachutes, the lower or outer edges of the fabric to which the cords are attached are folded upwards for a short distance before the sections are folded together in the ordinary manner, or with the same object, a flat spring is inserted in the hem round the inner edge and may extend round the parachute or only a section of it. This spring will increase the efficiency by maintaining a level edge when the parachute fabric is extended.

When dealing more especially with dead loads such as mail bags and parcels the box or container with the load suspended from its lower end is preferably supported in a casing or guide by lever catches and allowed to drop by withdrawing the catches.

Figure 14:
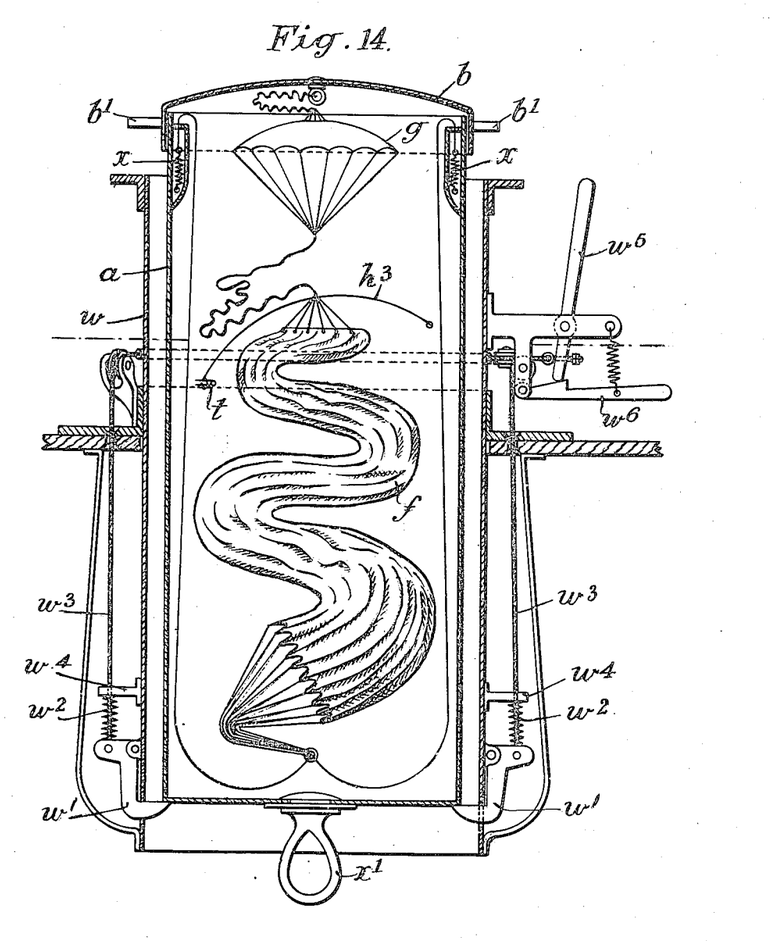
Figs. 14 and 15 are sectional elevation and plan respectively of a modified form of construction of parachute apparatus for lowering mail bags or parcels from aircraft.
Figure 15:
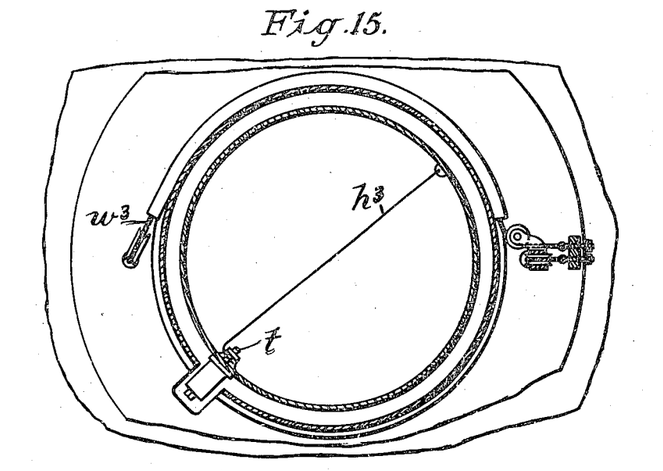

Such an arrangement is illustrated in Figs. 14 and 15 where a box $a$ of cylindrical shape is shown supported in a casing $w$ of cylindrical shape intended to be fixed in a convenient position in the bottom of the fuselage of an aeroplane. Two diametrically opposed lever catches $w'$ are pivoted near the lower end of the case and project into the casing through slots to a sufficient extent to engage under the bottom of the parachute box or container $a$.

Springs $w^2$ force the catches into the engaging position from which they can be withdrawn by cords $w^3$ passing through guide brackets $w^4$ and over pulleys and connected with a hand lever $w^5$ cooperating with a latch lever $w^6$ for retaining the lever $w^5$ and catches in the release position. When the box is released and drops out of the casing its cover $b$ is arrested by stops $b'$ thereon striking against the top of the casing and by this means the parachute $g$ is withdrawn and the cord connecting same with the cover is broken. The application of a delay time fuse and release bolt of the type shown in Fig. 17 is illustrated diagrammatically in Figs. 14 and 15 being employed to release a cord $h^3$ by the withdrawal of the release bolt $t$. In this case the electric igniting circuit for the fuse could be closed by one of the stops $b'$ operating suitable contacts on the top of the casing or in other ways.

The part containing the time fuse projects outside the container and through a slot in the casing which permits it to descend freely with the container.

In order to mitigate to some extent the shock on the cords of the main parachute when it opens fully, these cords are shown connected to the box by springs $x$.

Figure 16:
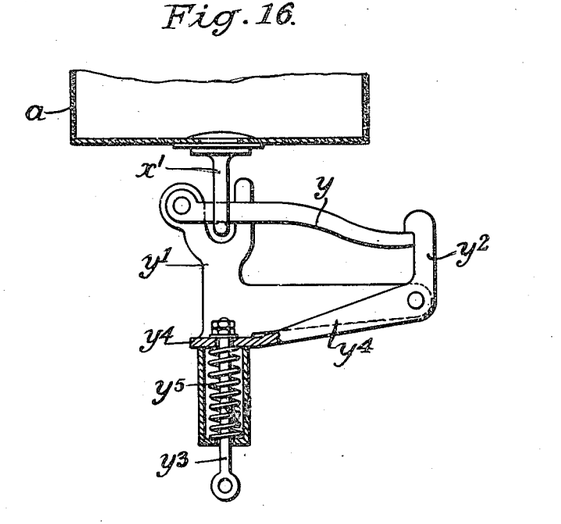
Fig. 16 is an elevation partly in section illustrating an automatic releasing device for uncoupling the load from the parachute upon reaching the ground.

The load is connected to the coupling eye $x'$ provided on the bottom of the box $a$ and in Fig. 16 a coupling device is shown which is adapted to automatically uncouple the load from the box when the load touches the ground to prevent it being dragged over the ground by the parachute. For this purpose a coupling pin $y$ is pivoted on one arm of an angular member $y'$ and held operative by a catch $y^2$ pivoted on another arm of the member $y'$. A third arm forms a tubular guide for an eye bolt $y^3$ which passes through the apertured end of an integral arm $y^4$ on the catch $y^2$, and owing to the pull of the load which is attached to the eye bolt, holds the catch in engagement against the action of a spring $y^5$ tending to release the catch. When, however, the load touches the ground and thus relieves the weight on the bolt $y^3$, the spring operates to release the catch and uncouple the load.

It will be understood that automatic release devices other than shown in Fig. 14 may be employed to delay the release of the main parachutes such delay devices being arranged to operate release bolts, or to release a retaining cord by other means.

Figures 20, 21:
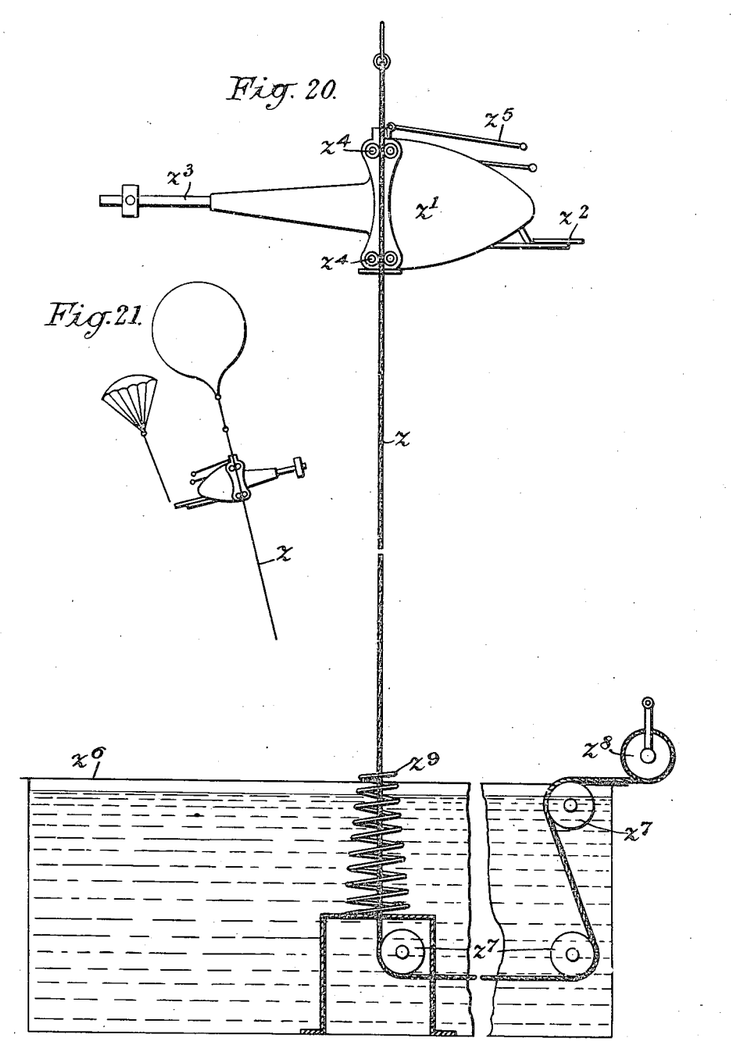
Figs. 20 and 21 illustrate apparatus for training airmen in the use of the parachute.

For training airmen in the use of the parachute as described it is proposed as illustrated diagrammatically in Figs. 20 and 21 to employ a captive balloon and to mount on the cable or rope $z$ a carriage $z'$ comprising a platform $z^2$ with a long counterweighted arm $z^3$ for balancing the weight of the man on the platform.

The counterweighted arm $z^3$ is so adjusted that the platform side of the carriage $z'$ with the man upon it is slightly heavier than the counterweight, the object being to ensure that when the rope $z$ is at an angle to the vertical due to the action of the wind on the balloon the platform side will set itself "down wind" in relation to the rope, that is to say it will be more or less below the rope.

The carriage is fitted with pairs of grooved wheels or rollers $z^4$ arranged to run on the rope of the balloon and with a brake controlled by a lever $z^5$ as shown or by Bowden wire or other mechanism and adapted to lock the carriage to the rope so that it can be taken up thereby as the balloon ascends and then released and allowed to fall with the airman equipped with his parachute.

An automatic clutch brake may also be fitted to the carriage in addition to the hand brake.

At first, until the airman has acquired sufficient confidence he is strapped to the carriage and falls with it, but later he merely holds on to the carriage by hand and when the pilot or main parachute opens leaves the platform. For preventing injury to the carriage, or the airman a tank $z^6$ would be constructed for the carriage to fall into the rope or cable of the balloon being suitably guided through this tank over pulleys $z^7$ to the winding drum $z^8$. A spring or pneumatic buffer $z^9$ may also be mounted in the tank for the carriage to fall upon. Instead of connecting the rope or cable to a balloon it may be attached to a high chimney or tower by means of a pivoted arm capable of being adjusted according to the direction of the wind to set the rope and apparatus down wind in relation to the chimney or tower.

I claim:

1. In parachute apparatus, a case, a main parachute therein and connected thereto, a pilot parachute also in the case and connected to the main parachute, and releasable means to retain the main parachute in the case for a period after the pilot parachute has been released.

2. In parachute apparatus, a case, a main parachute therein and connected thereto, a pilot parachute also in the case and connected to the main parachute, means to retain the main parachute in the case after the pilot parachute has been launched, and timing means to cause the said retaining means to thereafter release the main parachute.

3. In parachute apparatus, a case, a main parachute therein and connected thereto, a manually releasable pilot parachute in the case, a connecting cord between the pilot parachute and the main parachute, a signalling means releasable with the parachutes, and releasable means to retain the main parachute in the case for a period after the pilot parachute has been released.

4. In parachute apparatus for lowering loads from air craft, a case, means for detachably connecting the case with the load to be lowered, a main parachute in the case and connected thereto, a pilot parachute also in the case and connected to the main parachute, and releasable means to retain the main parachute in the case for a period after the pilot parachute has been released.

5. In parachute apparatus for lowering loads from aircraft, a case, means for detachably connecting the case with the load to be lowered, a main parachute in the case and connected thereto, a pilot parachute also in the case and connected to the main parachute, means to retain the main parachute in the case after the pilot parachute has been launched and timing means to cause the said retaining means to thereafter release the main parachute.

6. In parachute apparatus for lowering loads from aircraft, a case, means for detachably connecting the case with the load to be lowered, a main parachute in the case, a reel in and connected to the case and to which the cords of the main parachute are attached, a pilot parachute also in the case and connected to the main parachute, and releasable means to retain the main parachute in the case for a period after the pilot parachute has been released.

7. In parachute apparatus for lowering loads from aircraft, a parachute retaining and launching case having a hinged lid and detachable flap, means for detachably connecting the case with the load to be lowered, a main parachute in the case and connected thereto, a pilot parachute also in the case and connected to the main parachute, and releasable means to retain in the main parachute in the case for a period after the pilot parachute has been released.

8. In parachute apparatus for lowering loads from aircraft, a case, a main parachute therein and connected thereto, a pilot parachute also in the case and connected to the main parachute, means to retain the main parachute in the case after the pilot parachute has been launched, timing means to cause the said releasing means to thereafter release the main parachute, load-carrying means and coupling means to connect the load carrying means to the case and adapted to uncouple the load carrying means from the case when the load reaches the ground.

In testimony whereof he has affixed his signature.

HAROLD EDWARD SHERWIN HOLT.